United States Patent [19]

Humber et al.

[11] Patent Number: 5,138,882

[45] Date of Patent: Aug. 18, 1992

[54] METHOD AND APPARATUS FOR MEASURING STATIC UNBALANCE OF A ROTARY MEMBER

[75] Inventors: Kurt Humber, Griesheim; Günther Rossmann, Lautertal, both of Fed. Rep. of Germany

[73] Assignee: Gebr. Hofmann GmbH & Co. KG Maschinenfabrik, Pfungstadt, Fed. Rep. of Germany

[21] Appl. No.: 523,544

[22] Filed: May 15, 1990

[30] Foreign Application Priority Data

Aug. 18, 1989 [DE] Fed. Rep. of Germany ....... 3927314

[51] Int. Cl.$^5$ .......................................... G01M 1/12
[52] U.S. Cl. .......................................... 73/483
[58] Field of Search .......................... 73/482, 483, 486

[56] References Cited

U.S. PATENT DOCUMENTS 4,060,003 11/1977 Bacsanyi et al. .................. 73/483

FOREIGN PATENT DOCUMENTS 2945819 9/1989 Fed. Rep. of Germany .

OTHER PUBLICATIONS

Gunther Himmler, "Ursachen und Messung der Schleifscheibenunwucht bei der Herstellung", Hoffman News, vol. 8.
Gunther Himmler-Peter Drust, "Waagen zum Auswuchten und Massentarieren", Hoffman News, vol. 11.
Grundkurs der Regelungstechnik, Einfuhrung in die Praktischen und Theortetischen Methoden, by Ludwig Merz and Hilmar Jaschek, (R. Oldenbourg Verlag, Munich, 1985) pp. 186-191.

*Primary Examiner*—John E. Chapman
*Attorney, Agent, or Firm*—Cushman, Darby & Cushman

[57] ABSTRACT

In a method and apparatus for measuring static unbalance of a rotary member, involving determining the axial moment of inertia of the rotary member which is mounted pivotably in a horizontal position in a balancing system, about an axis of the balancing system, a deviation of the rotary member from its horizontal position is detected and a return force for returning the rotary member to the horizontal position is produced in response to a control parameter from a regulating circuit in dependence on the detected deviation, with regulation of the return force also being effected in dependence on the weight of the rotary member. The value of the static unbalance of the rotary member is formed from the measured return force.

9 Claims, 2 Drawing Sheets

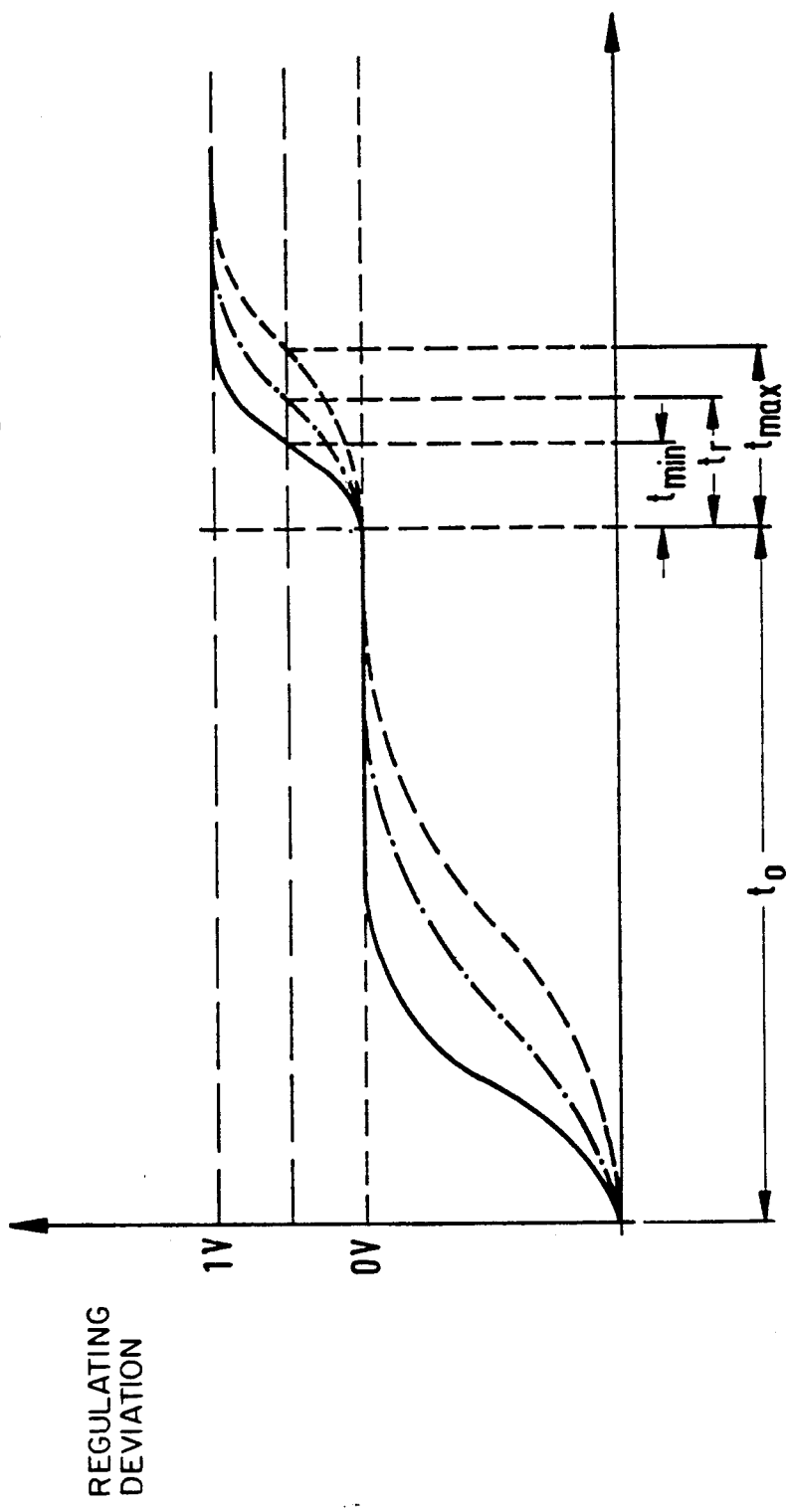

METHOD AND APPARATUS FOR MEASURING STATIC UNBALANCE OF A ROTARY MEMBER

BACKGROUND OF THE INVENTION

There are various ways of measuring static unbalance of a rotary member, such as a grinding wheel, motor vehicle wheel and the like. One form of such a procedure, as disclosed in DE 29 45 819 A1 and Hofmann News 8 (05.85 D) and 11 (10.88) involves determining the axial moment of inertia of the rotary member when mounted pivotably in a horizontal position, that is to say with the axis of rotation of the rotary member extending vertically. In that procedure, in dependence on a deviation of the rotary member from its initial horizontal position, a return force effective to return the rotary member to its horizontal position is produced in a regulating circuit as a control parameter, and the value of the static unbalance from which the rotary member suffers is formed from the measured return force. To perform that procedure, the rotary member to be measured is placed with its axis of rotation vertical, on a horizontal balancing tray member or plate which is mounted in such a way as to be pivotable, preferably by means of a gimbal or Cardan-type mounting arrangement. If the rotary member suffers from an unbalance, that means that the center of gravity of the rotary member is shifted and a moment corresponding to the static unbalance from which the rotary member is suffering is operative about the pivot mounting axis of the balancing tray member or plate. If the balancing tray member or plate is subjected, at a constant spacing from the pivot mounting axis thereof, to a force which causes the balancing tray member or plate to return to its horizontal position, the force applied, being proportional to the static unbalance, makes it possible to determine the unbalance of the rotary member.

In an apparatus for carrying out that procedure, the deviation of the balancing tray member or plate is detected by suitable means and, in dependence on the deflection signal, an electronic measuring and regulating system produces an electrical current and supplies it to a return or restoring means which includes an electromagnet unit and which is operable to return the weighing tray member or plate into its horizontal position. The current forming the control parameter for the regulating circuit is proportional to the force applied by the return or restoring means and is thus also proportional to the static unbalance of the rotary member to be tested.

The above-outlined operating procedure and the apparatus for carrying out same enjoy the advantage that the fact of using the described compensation principle means that there is no residual deflection of the balancing tray member or plate, and thus the unbalance measurement result is not falsified in that way. When measuring rotary members which are of different weights however it is not possible to adhere to a specific cycle time for carrying out the unbalance measuring operation as the regulator involves constant regulating parameters and depending on optimum adjustment of the regulator, positioning of the balancing tray member or plate in its horizontal position, when dealing with different types of rotary member which involve different weights, requires different positioning times. Hitherto, optimum adjustment of the system has been effected in relation to a low rotary member weight in order to avoid the generation of high control parameter signals which could result in the regulating circuit suffering from instabilities. When measuring types of rotary member which are of relatively high weight however, it has to be accepted in that situation that the time for the balancing tray member or plate to return to its horizontal position and thus the cycle time involved in carrying out the rotary member unbalance measuring procedure is increased.

SUMMARY OF THE INVENTION

An object of the present invention is to provide a method of measuring static unbalance of a rotary member, which affords reliable results with an optimum regulating action, while nonetheless involving short operating cycle times.

Another object of the present invention is to provide a rotary member static unbalance measuring method which is more rationally applicable to a wide range of rotary member weights.

Still another object of the present invention is to provide a rotary member static unbalance measuring method which is simple to operate while nonetheless affording a substantial level of accuracy.

A further object of the present invention is to provide an apparatus for measuring static unbalance of a rotary member, which is of a simple design configuration and which also gives reliable and stable results.

Still a further object of the invention is to provide a rotary member static unbalance measuring apparatus which is quick and easy to operate.

In accordance with the present invention, in a first aspect, these and other objects are attained by a method of measuring static unbalance of a rotary member, by determining the axial moment of inertia of the rotary member which is mounted pivotably in a horizontal position. In dependence on a deviation of the rotary member from its horizontal position, under the effect of an unbalance thereof, a return force for returning the rotary member to its initial horizontal position is produced as a control parameter in a regulating circuit. The value of the static unbalance of the rotary member is formed from the measured return force, and regulation of the return force is further effected in dependence on the weight of the rotary member being measured.

In accordance with the invention, in a second aspect, the foregoing and other objects are achieved by means of an apparatus for measuring static unbalance of a rotary member comprising a balancing tray member or plate for carrying the rotary member to be measured, the balancing tray member being mounted pivotally and being disposed in a horizontal position in a rest condition of the apparatus. A measurement value pick-up or detector means is operable to produce a deviation or deflection signal when the balancing tray member departs from its horizontal position, the deviation signal being passed to a regulating means which receives the deviation signal as a regulating parameter. A return means is connected to the regulating means and receives a control parameter signal therefrom, to control return of the balancing tray member to its horizontal position. A measuring means is operable to determine the control parameter signal which is thus proportional to the static unbalance. The apparatus further includes means for setting the regulating parameters of the regulating means in dependence on the weight of the rotary member being measured.

The teaching of the present invention thus provides for optimization of the regulating parameters or regulating coefficients which, in the case of a PID-regulator are the proportional coefficient, the integrating coefficient and the differentiating coefficient, over the entire range of weights of rotary members to be measured. In that way, for each type of member or for each weight of member involved, in a static unbalance measuring operation, it is possible to provide for the shortest possible cycle time in particular in regard to positioning of the balancing tray member in a horizontal position. The procedure and apparatus according to the invention preferably use a digital PID-regulator. There are various possible ways of ascertaining the PID-regulator parameters before or during the regulating and measuring procedure, for example it is possible to set the regulating parameters or factors in the manner disclosed in 'Grundkurs der Regelungstechnik' ['Basic Course in Regulating Procedures'] by Dr L Merz and Dr H Jaschek, 8th edition, pages 186 to 191, in particular by reference to the characteristics and behaviour of the regulating circuit at the stability limit. Generally the rotary members to be measured which may be for example grinding wheels, motor vehicle wheels and the like, are subdivided into given types or categories of rotary member. Certain specific rotary member data, inter alia a specific weight, are allocated to the individual types or categories of rotary members. The specific rotary member weight relating to each given type is taken into consideration in accordance with the principles of the invention to provide for optimum setting of the regulating parameters or coefficients of the regulator such as the PID-regulator. If the rotary member weight is not known, it will be appreciated that it can be ascertained by balancing before carrying out the operating procedure of the invention.

Further objects, features and advantages of the invention will be apparent from the following description of a preferred embodiment.

BRIEF DESCRIPTION OF THE DRAWING

FIG. 2 shows a graph illustrating a regulating procedure for a type of rotary member to be measured.

DESCRIPTION OF THE PREFERRED EMBODIMENT

Figure 1:
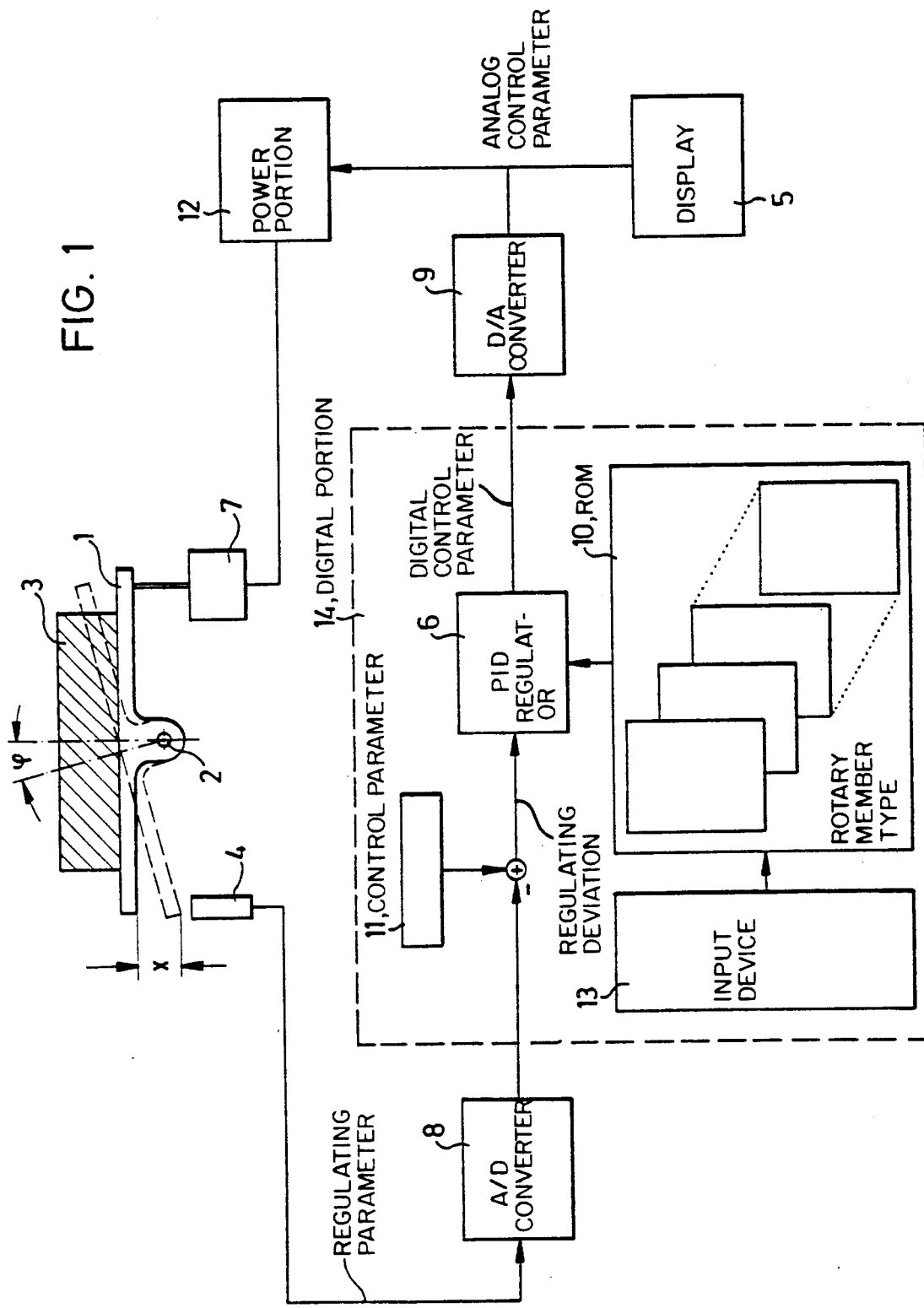
FIG. 1 is a diagrammatic view of an embodiment of a rotary member static unbalance measuring apparatus according to the invention.

Referring firstly to FIG. 1, shown therein is a measuring apparatus for measuring the static unbalance of a rotary member, comprising a balancing tray member or plate 1 which in a rest condition of the apparatus is disposed in at least substantially horizontal position and which is mounted pivotably about an axis as indicated at 2. Preferably, the apparatus involves a Cardan-type or gimbal mounting assembly for the balancing tray member 1, for use with two axes which are displaced through 90° relative to each other, for example using the configuration disclosed in DE-29 45 819 A1 which is hereby incorporated by reference.

Reference numeral 3 in FIG. 1 denotes a rotary member to be measured, which is arranged on the balancing tray member 1 in such a way that the axis of rotation about which the rotary member 3 rotates in normal operation thereof is disposed vertically and thus perpendicularly to the upward surface of the at least substantially horizontally disposed balancing tray member 1.

Reference numeral 4 identifies a measurement value pick-up means or detector for detecting a deviation X of the balancing tray member 1 from its rest position, that deflection corresponding to an angle $\phi$ of pivotal movement of the balancing tray member 1 about its mounting axis 2. Instead of a measurement value pick-up device 4, it is also possible to provide two measurement value pick-up devices which are preferably in the form of distance-measuring detectors, as illustrated for example in Hofman News 11.

An output signal is delivered by way of an analog-digital converter 8 from the measurement value pick-up device 4. A reference value is held in a storage device or memory 11 and specifies a predetermined deflection x (amplitude). The difference of the output signal and of the reference signal is passed as a deviation parameter to a digital PID-regulator 6. The PID-regulator 6 forms a control parameter signal which is passed by way of a digital-analog converter 9 to a power portion 12. In dependence on the control parameter signal generated by the digital PID-regulator 6, the portion 12 produces a drive current which is passed to a restoring or return device 7. The device 7 includes an electromagnet unit which is thus fed with the drive power from the power portion 12. The electromagnet unit applies to the balancing tray member 1 a return or restoring force for returning the balancing tray member 1 to its horizontal position, after it has been deflected therefrom under the effect of an unbalance of the rotary member 3 carried thereon. The restoring force is thus proportional to the static unbalance of the rotary member 3 which caused the balancing tray member 1 to be pivoted about its axis 2 from its original horizontal position, by the deflection distance indicated by X and the angle $\phi$.

The drive current supplied by the power portion 12 to the return device 7 is proportional to the force to be applied by the return device 7. Therefore, for determining the static unbalance of the rotary member 3, it is possible to measure that current as is known for example from the construction disclosed in DE-29 45 819 A1. By virtue of the fact that the drive current is proportional to the control parameter signal in digital form as applied to the digital-analog converter 9, or the control parameter in analog form outputted by the converter 9 to the power portion 12, the static unbalance of the rotary member 3 may also be directly specified by a display of the suitably scaled control parameter signal at a display device 5 which may be of an analog or digital nature, depending on the circuitry involved. When using the analog form, the display device 5 is preferably connected between the digital-analog converter 9 and the power portion 12, as illustrated in the FIG. 1 circuit. When using a digital set-up however, the display device 5 is then preferably connected between the regulator 6 and the digital-analog converter 9.

The arrangement according to the invention also involves a read only memory 10 which is suitably connected to the digital regulator 6. The memory 10, in relation to different types of rotors 1 . . . n, stores the respective optimum regulating parameters (proportional coefficient P, integrating coefficient I and differentiating coefficient D) in dependence on the different weights of the respective types of members 1-n. In that connection each of the regulating parameters is set, in a weight-related manner, to an optimum value which is in accordance with the following relationship:

$$RP = RP\text{max} - \frac{G\text{max} - Gr}{m} \quad (1)$$

in which RP identifies the optimum regulating parameter, RPmax identifies a regulating parameter which is the optimum one for a maximum rotary member weight, Gmax identifies a maximum rotary member weight, Gr identifies the weight of a rotary member to be measured, and m identifies the quotient from the difference between maximum and minimum rotary member weight (Gmax−Gmin) and the difference from the two optimum regulating parameters (RPmax−RPmin) for the maximum and minimum rotary member weights, that is to say:

$$m = \frac{G\text{max} - G\text{min}}{RP\text{max} - RP\text{min}} \quad (2)$$

Each of the three regulating parameters is calculated in a weight-dependent manner for each type of rotary member 1-n, in accordance with the two relationships set forth above, and stored in the memory 10 at appropriate locations associated with the respective types of rotary members.

In performing an unbalance measuring operation, the operator of the apparatus illustrated is then only required to introduce the appropriate type of rotary member or weight of rotary member, into an input device 13 which is suitably connected to the memory 10, and the corresponding regulating parameters are then available for the regulating procedure and the measuring operation, at the PID-regulator 6.

Another possible procedure for weight-dependent optimization of the individual regulating parameters in relation to the various types of rotary member 1-n may be as set out below, involving effecting adjustment in respect of the type of rotary member in a measuring operation in which the weight of the rotary member to be measured is approximately ascertained.

Referring therefore now to FIG. 2, using fixedly defined regulating parameters, the balance tray member indicated at 1 in FIG. 1 is firstly positioned in a horizontal position, which constitues the rest condition of the apparatus, without a loading applied thereto by a rotary member thereon, within the period of time indicated at to in FIG. 2. That phase is indicated by the solid line in FIG. 2. The regulating deviation is then as indicated at OV in FIG. 2. Then, to produce a jump in the reference value involved, the reference value indicated at 11 in FIG. 1 is caused to jump, and the period of time tmin which is then required for the balancing tray member 1 to assume 50% of its new reference position which corresponds for example to a jump in the reference value 11 as indicated at 1V in FIG. 2, is measured. The same procedure is effected with maximum loading on the balancing tray member 1 with a rotary member 3 involving maximum rotary member weight. The dashed line in FIG. 2 shows the regulating procedure involved in that situation. The measured time tmax is necessary in order for the balance tray member 1 when loaded with the maximum rotary member weight to assume 50% of the freshly set reference value. The time measurement operation may also be effected relative to another percentage of the fresh reference position, for example at 70% thereof.

FIG. 2 also shows the regulating procedure, indicated in dash-dotted line, for a type of rotary member to be measured. In that situation, when using the reference value voltage jump, the time required for the balancing tray member 1 to assume 50% of the new reference position thereof is indicated at tr in FIG. 2.

Optimization of the respective regulating parameters RP in dependence on the different weights of the types of rotary member 1-n is effected in accordance with the following relationships:

$$RP = RP\text{max} - \frac{t\text{max} - tr}{m} \quad (3)$$

wherein $$m = \frac{t\text{max} - t\text{min}}{RP\text{max} - RP\text{min}} \quad (4)$$

In the foregoing relationship, tr represents the time required in relation to the respective rotary member to be measured, for that rotary member to be moved into 50% of the reference position set by the jump in control parameter, in accordance with the procedure described above with reference to FIG. 2. In that connection, it is preferable for the slope in respect of the straight-line equation m to be stored beforehand in a suitable memory so that, after the measuring operation has been carried out, for the purposes of ascertaining the time tr, the above-indicated value m is immediately available for determining the optimum regulating parameters.

The optimum regulating parameters (P-, I- and D-components) which are determined in that way in respect of the respective types of rotary members are stored in the memory 10 shown in FIG. 1, and called up in dependence on the type of rotary member to be measured, for input into the PID-regulator 6. As FIG. 1 shows, the regulator 6, the memory 11 for the reference value, the memory 10 and the input device 13 may be combined together to form a digital portion or unit as indicated at 14.

For types of rotary members which are not included in the memory 10, it is also possible, prior to carrying out the rotary member unbalance measuring operation, to determine the time tr required for the rotary member to be measured, and for the regulating parameters RP to be calculated in accordance with the foregoing relationships (3) and (4) in a suitable calculating device or computer (not shown), the regulating parameters then being introduced into the regulator 6 in order for the unbalance measuring procedure to be effected.

Input of the fresh reference position may be effected for example by supplying a suitable digital value to the digital-analog converter 9. The power portion 12 will then supply a suitable current which is passed to the return means 7 which then moves the balancing tray member 1 from the horizontal starting position into the new reference position.

It will be appreicated that the above-described procedures and apparatus have been set forth solely by way of example and illustration of the principles of the present invention and that various modifications and alterations may be made therein without thereby departing from the spirit and scope of the invention.

We claim:

1. A method of measuring static unbalance of a rotary member by determining the axial moment of inertia of the rotary member when pivotably supported in a horizontal position, comprising the steps of:

(a) detecting a pivotal deviation of the rotary member from its horizontal position under the effect of an unbalance of the rotary member;

(b) generating a deviation parameter from the difference between a reference value and the detected pivotal deviation;

(c) passing the deviation parameter to a regulating circuit which produces a control parameter;

(d) said control parameter is further produced in dependence on the weight of the rotary member;

(e) producing and applying a return force to the rotary member for returning the rotary member to the horizontal position, the return force being produced in dependence on the control parameter;

(f) measuring the return force; and (g) determining the value of the static unbalance from the measured return force.

2. Apparatus for measuring static unbalance of a rotary member comprising:

(a) a tray member for carrying a rotary member to be measured;

(b) mounting means for horizontally and pivotably mounting the tray member;

(c) measurement value pick-up means for producing a deviation signal when the tray member deviates from a horizontal position by a pivotal movement;

(d) deviation parameter means for producing a deviation parameter signal from the difference between a reference value and the deviation signal;

(e) regulating means connected to the deviation parameter means for receiving the deviation parameter signal to produce therefrom a control parameter signal which is proportional to the static unbalance of the rotary member;

(f) return means connected to the regulating means for receiving the control parameter signal from the regulating means and adapted to return the tray member to its horizontal position;

(g) measuring means for measuring the control parameter signal; and (h) means for setting regulating parameters of the regulating means in dependence on the weight of the rotary member being measure.

3. Apparatus as set forth in claim 2 wherein each regulating means parameter RP is set in accordance with the following relationship in dependence on the weight of the rotary member:

$$RP = RPmax - \frac{Gmax - Gr}{m}$$

wherein RP denotes the regulating means parameter, RPmax denotes a regulating means parameter which is optimum for a maximum rotary member weight, Gmax denotes a maximum rotary member weight, Gr denotes the weight of the rotary member to be measured and m denotes the quotient from the difference between the maximum and minimum rotary member weights and the difference between the two optimum regulating means parameters for the maximum and minimum rotary member weights.

4. Apparatus as set forth in claim 2 wheerein each regulating means parameter RP is set in accordance with the following relationships in dependence on the weight of the rotary member:

$$RP = RPmax - \frac{tmax - tr}{m}$$

and $$m = \frac{tmax - tmin}{RPmax - RPmin}$$

wherein RP denotes the regulating means parameter, RPmax denotes a regulating means parameter which is optimum for a maximum rotary member weight, RPmin denotes a regulating means parameter which is optimum for a minimum rotary member weight, tmax is the time required to move a rotary member of maximum weight positioned on the tray member in a horizontal position into a new reference value position which is set by a variation in a reference value, tmin denotes the time required to move the tray member positioned in a horizontal position and loaded with a minimum weight into the new reference value position which is freshly set by virtue of the change in the reference value, and tr is the time required to move the tray member loaded with the weight of the rotary member to be measured from the horizontal position into the new reference value position which is freshly set by virtue of the altered reference value.

5. Apparatus as set forth in claim 4 including means for altering the referencee value to set the respective fresh reference value position.

6. Apparatus as set forth in claim 2 including a read only memory connected to the regulating means for storing the regulating means parameters for different types of rotary members.

7. Apparatus as set forth in claim 2 wherein the regulating means is in the form of a digital regulating means.

8. Apparatus as set forth in claim 2 including a means for displaying the measured static unbalance of the rotary member as a scaled control parameter.

9. A method of measuring static unbalance of a rotary member, comprising the steps of:

(a) disposing the rotary member on a support having a support surface which in a rest condition is at least substantially horizontal and adapted to pivot about at least one horizontal axis, the rotary member being so positioned that its axis of rotation is at least substantially perpendicular to said support surface;

(b) detecting deviation of the support by a pivotal movement about said at least one horizontal axis under the effect of an unbalance of the rotary member;

(c) producing a return force effective to restore said support to said at least substantially horizontal position thereof in response to said deviation, the return force being regulated in dependence on said deviation and being further regulated in dependence on the weight of the rotary member being measured; and, (d) measuring the return force to ascertain the value of the static unbalance of the rotary member from the value of the return force.

* * * * *